(12) United States Patent
Gao et al.

(10) Patent No.: US 8,386,784 B2
(45) Date of Patent: Feb. 26, 2013

(54) APPARATUS AND METHOD FOR SECURELY SUBMITTING AND PROCESSING A REQUEST

(75) Inventors: Bo Gao, Beijing (CN); Lin Luo, Beijing (CN); Shun Xiang Yang, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 12/473,559

(22) Filed: May 28, 2009

(65) Prior Publication Data

US 2009/0300359 A1 Dec. 3, 2009

(30) Foreign Application Priority Data

May 29, 2008 (CN) .......................... 2008 1 0111012

(51) Int. Cl.
*H04L 9/32* (2006.01)
(52) U.S. Cl. ........................... 713/171; 713/170; 726/30
(58) Field of Classification Search .................. 713/171, 713/170, 168; 726/26, 27, 30; 709/225, 709/223
See application file for complete search history.

(56) References Cited

U.S. PATENT DOCUMENTS

| | | | |
|---|---|---|---|
| 6,823,359 B1 * | 11/2004 | Heidingsfeld et al. | 709/203 |
| 6,934,716 B2 * | 8/2005 | Bradley et al. | 1/1 |
| 7,089,425 B2 * | 8/2006 | Chan | 713/189 |
| 7,100,054 B2 * | 8/2006 | Wenisch et al. | 713/185 |
| 7,325,185 B1 | 1/2008 | Szor | |
| 8,051,465 B1 * | 11/2011 | Martin et al. | 726/3 |
| 8,112,799 B1 * | 2/2012 | Loiodice et al. | 726/22 |
| 8,219,808 B2 * | 7/2012 | Belohoubek et al. | 713/168 |
| 2004/0260754 A1 | 12/2004 | Olson et al. | |
| 2007/0186282 A1 | 8/2007 | Jenkins et al. | |
| 2008/0034424 A1 * | 2/2008 | Overcash et al. | 726/22 |
| 2008/0082602 A1 * | 4/2008 | Morikawa | 709/203 |
| 2008/0222736 A1 * | 9/2008 | Boodaei et al. | 726/27 |
| 2008/0263650 A1 * | 10/2008 | Kerschbaum | 726/9 |
| 2009/0249489 A1 * | 10/2009 | Livshits et al. | 726/26 |

FOREIGN PATENT DOCUMENTS

| | | |
|---|---|---|
| CN | 101051898 A | 10/2007 |
| EP | 1420562 A3 | 5/2004 |

* cited by examiner

*Primary Examiner* — Zachary A Davis
(74) *Attorney, Agent, or Firm* — Tutunjian & Bitetto, P.C.; Gail Zarick

(57) ABSTRACT

An apparatus and a method for securely submitting a request and an apparatus and a method for securely processing a request. The apparatus for securely submitting a request includes a request pre-submitting component and a request confirmation component. The request pre-submitting component sends a request with a unique identifier to a server and sends an alarm message containing the unique identifier and a request description to the request confirmation component. The request confirmation component contains a key inaccessible to other components in a client. It pops up a request confirmation window, on which the request description is displayed, in response to the alarm message and generates a request confirmation message associated with the request by using the key and the unique identifier.

16 Claims, 4 Drawing Sheets

APPARATUS AND METHOD FOR SECURELY SUBMITTING AND PROCESSING A REQUEST

CROSS REFERENCE TO RELATED APPLICATION

This application claims priority under 35 U.S.C. 119 from Chinese Patent Application 200810111012.6, filed May 29, 2008, the entire contents of which are incorporated herein by reference.

BACKGROUND OF THE INVENTION

1. Field of the Invention

The present invention relates to the field of computer network security and, in particular, to an apparatus and a method for securely submitting a request in a client and for securely processing a request in a server.

2. Description of Related Art

With the development of computer and Internet technologies, web applications, such as, Internet shopping and Internet banking, have been increasingly popularized. Client-side scripts are often utilized in these Web applications to improve user experience. However, the accompanying security issues have been increasingly serious, wherein Cross-Site Script (XSS) and Cross-Site Request Forgery (CSRF) attacks are typical.

The XSS attack refers to an attacker embedding a malicious script into a link that appears to be from a trustworthy source so that the embedded malicious script is sent to a client of a victim for execution, for example, in order to steal sensitive information of the user, when the victim clicks on the link. Also with use of the "Asynchronous JavaScript combined with the XML" (AJAX), the XSS attack can make a malicious request in the name of the victim without refreshing a new webpage, which may make such an attack much more concealed and hazardous. The CSRF attack refers to an attack where, for example, an email or a picture in which a malicious script is embedded is sent to a victim, so that the victim submits unwittingly a request to a server through a session started by the victim.

A combination of the XSS and CSRF attacks may be more hazardous. For a vulnerable web application exposed under this combination of the attacks, a server almost can not determine whether a received request is sent from a legal user or an embedded malicious script. As a result, the server has to just process blindly the request such as an account transfer request, which may result in a great loss of user benefit.

US20040260754 discloses a system and a method for alleviating XSS attack. In this patent document, a malicious script in an HTTP request is filtered at a server, that is, an input validation is performed at the server to prevent any malicious script from being injected and being propagated and executed at a browser of a user. Unfortunately, this solution can not address the problem of the CSRF attack for which no injection of a script is required at the server.

A solution of installing a security defense tool in a from of, e.g., a browser plug-in an ActiveX component, etc. at a client has also been proposed in the prior art so as to identify a legal script and a fraudulent attack with script injection at the client. However, for this solution, the user may be reluctant to install any new plug-in at the client in view of security, user experience, etc., and a potential plug-in conflict may occur with different applications.

To prevent the CSRF attack, a solution of adopting an unpredictable parameter or a secret token, which may increase the difficulty to forge a request, has been proposed in the prior art. However, this unpredictable parameter or secret token may be obtained by an attacker with the XSS attack, and consequently this solution can not prevent the combination of the XSS and CSRF attacks. In addition, for a solution in which a user is required to input his or her password for each request, the user experience may be very bad and the possibility of password theft may be increased.

SUMMARY OF THE INVENTION

In view of the above, this invention provides an apparatus and a method for securely submitting a request in a client and an apparatus and method for securely processing a request in a server to prevent a combination of XSS and CSRF attacks, thereby enhancing security of a Web application.

One embodiment of the invention provides an apparatus for securely submitting a request to a server from a client. The apparatus includes: a request pre-submitting component configured to send a request with a unique identifier to the server and a request confirmation component containing a key inaccessible to other components. The request pre-submitting component is configured to send an alarm message containing the unique identifier and a request description of the request to the request confirmation component. The request confirmation component is configured to pop up a request confirmation window, on which the request description is displayed, in response to the alarm message. The request confirmation component is further configured to generate a request confirmation message associated with the request by using at least the key and the unique identifier and to send the message to the server in response to confirmation of legality of the request.

Another embodiment of the invention provides a method for securely submitting a request in a client. The method includes the steps of: obtaining a unique identifier for a request; sending a request with the unique identifier to a server; popping up a request confirmation window, on which a description of the request is displayed; receiving a confirmation of legality of the request; and, in response to the confirmation of legality of the request, generating a request confirmation message associated with the request by using at least the key and the unique identifier and sending the message to the server.

Still another embodiment of the invention provides an apparatus for securely processing a request in a server. The apparatus includes: means for receiving from a client a request, a request confirmation message and a unique identifier associated with the request; a request suspending unit configured to suspend the request; a request verification unit configured to verify whether the request is a legal request, in accordance with the request confirmation message associated with the request by the unique identifier; and a request execution unit configured to execute the request when the request is a legal request.

Yet another embodiment of the invention provides a method for securely processing, in a server, a request from a client. The method includes the steps of: receiving a request with a unique identifier from the client; suspending the request; receiving a request confirmation message from the client, the request confirmation message being associated with the request by the unique identifier; verifying whether the request is a legal request in accordance with the request confirmation message from the client; and executing the request when the request is a legal request.

The present invention further provides computer readable media tangibly embodying a computer program for causing a computer to perform the methods referred to above.

Objects, features and advantages of the present invention will be made more apparent from the following detailed description of the preferred embodiments with reference to the drawings in which identical or corresponding reference numbers denote identical or corresponding technical features or components.

DETAILED DESCRIPTION OF THE PREFERRED EMBODIMENT

In the preferred embodiments of the present invention, the request confirmation message is generated with the key stored in the request confirmation component and inaccessible to other components in the client, thus ensuring that the request confirmation message can not be forged by a malicious script that may be injected into the other components of the client. The server can thus identify whether the request is legal by the non-forged request confirmation message associated with the request, thereby effectively preventing a combination of XSS and CSRF attacks.

Illustrative embodiments of the invention are described below with reference to the drawings.

Figure 1:
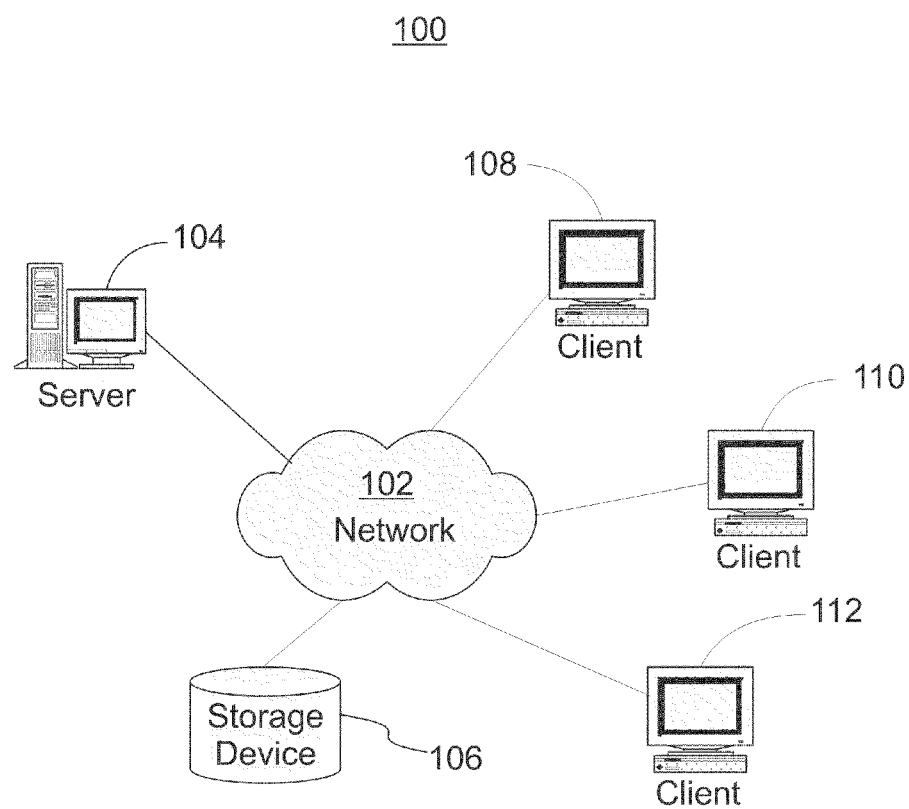
FIG. 1 illustrates a block diagram of an illustrative distributed data processing system that may implement the invention.

Referring to FIG. 1, a block diagram of a distributed data processing system that implements the invention is described. The distributed data processing system 100 is a computer network that may implement the invention, and includes a network 102, which is a medium providing communication links between computers or other devices connected together in the distributed data processing system 100.

A server 104 and a storage device 106 are connected together to the network 102. Also, clients 108, 110 and 112 such as a workstation, a personal computer, a mobile phone or a PDA are connected to the network 102. Server 104 provides the clients 108, 110 and 112 with data such as a boot file, an operating system, an application, etc. The distributed data processing system 100 may include additional server(s), client(s) and other devices which are not shown. In this example, the distributed data processing system 100 is the Internet and the network 102 denotes a collection of networks and gateways which communicate with each other by means of the TCP/IP protocol suite. Located at the heart of the Internet is a high-speed data communication backbone between primary nodes or hosts, which involves thousands of business, government, education and other computer systems for routing data and messages. Naturally, the distributed data processing system 100 may alternatively be implemented as different types of networks such as an intranet, a Local Area Network (LAN), a Wide Area Network (WAN), etc.

FIG. 1 is illustrative but not limiting of the processes according to the invention. The system illustrated in FIG. 1 can be modified without departing from the spirit and scope of the invention.

Figure 2:
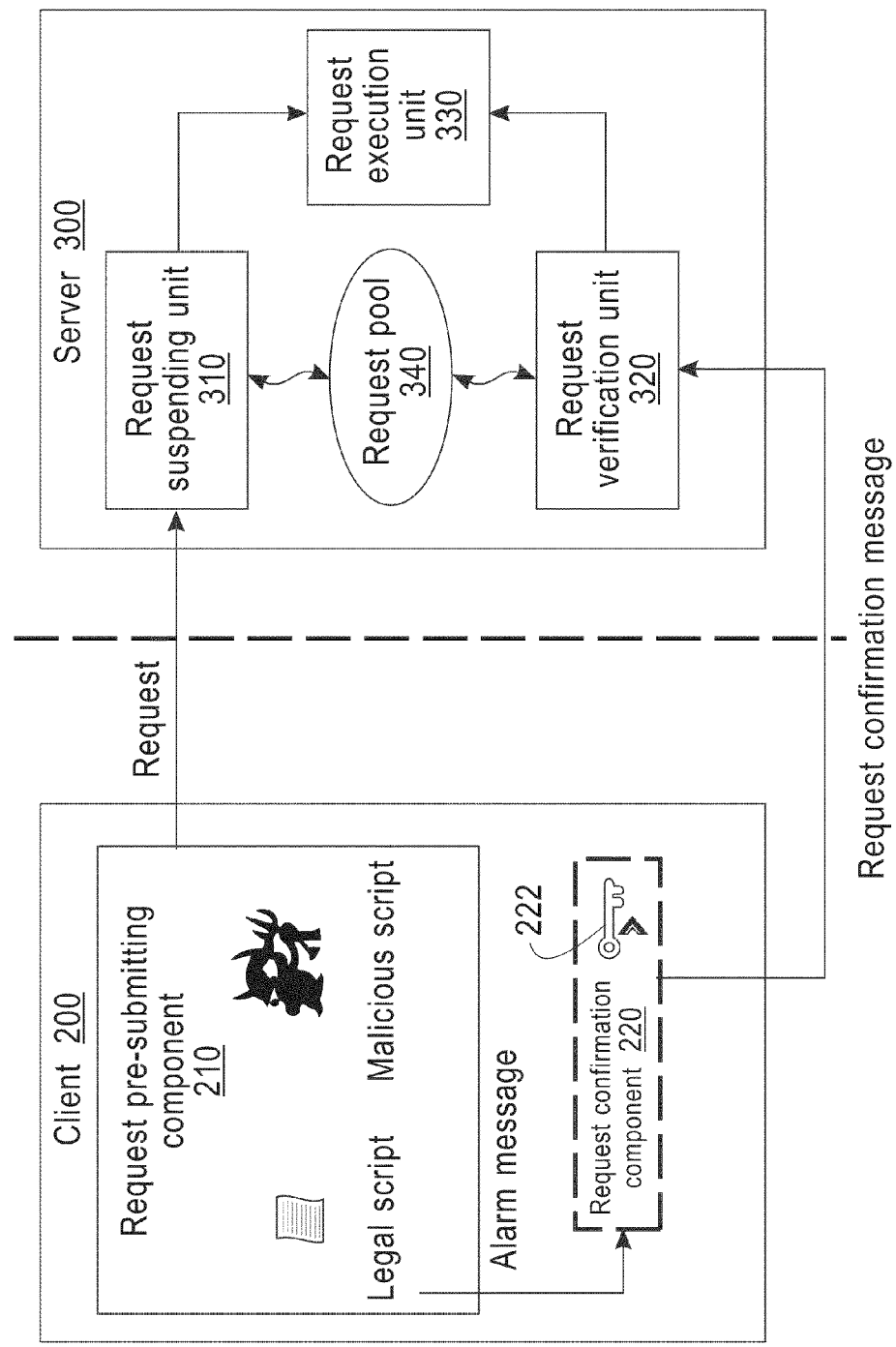
FIG. 2 illustrates a block diagram of structures of a server and a client in the distributed data processing system according to an embodiment of the invention.

FIG. 2 is a block diagram of structures of a server and a client in the distributed data processing system according to an embodiment of the invention.

As illustrated in FIG. 2, the distributed data processing system includes a client 200 and a server 300. The client 200 includes a request pre-submitting component 210 and a request confirmation component 220. The server 300 includes a request suspending unit 310, a request verification unit 320 and a request execution unit 330. Typically, these units in the server 300 may be present in an application server that supports a Web application.

At the client 200 side, the request pre-submitting component 210 sends a request with a unique identifier to the server 300. The request confirmation component 220 contains a key inaccessible to other components including the request pre-submitting component 210. The request pre-submitting component 210 further sends an alarm message containing the unique identifier and a request description of the request to the request confirmation component 220, and in response to the alarm message, the request confirmation component 220 pops up a request confirmation window on which the request description is displayed and generates a request confirmation message associated with the request by using at least the key and the unique identifier and sends the message to the server 300 in response to confirmation of legality of the request.

Specifically, the request pre-submitting component 210 in the client 200 is transferred from the server 300 to the client when a user accesses the server 300 through a browser such as Windows Internet Explorer, etc., and resides in the browser. When the user submits a request related to a sensitive action (e.g., an account transfer request) through the request pre-submitting component 210, the request pre-submitting component 210 sends to the server the request with a unique identifier (UID) for uniquely identifying the request. In addition, the request pre-submitting component 210 further sends an alarm message containing the UID and a request description of the request to the request confirmation component 220. Here, the request description of the request refers to a combination of an input value(s) of one or more fields which may be selected among fields of the request, wherein the selection of the fields may depend on a corresponding configuration policy at the server 300 side.

The request confirmation component 220 in the client 200 contains a key 222 inaccessible to other components including the request pre-submitting component 210. Optionally, the request confirmation component 220 and the key therein may be obtained from the server 300 each time the user logs on a Web application on the server 300. Thus, it is not necessary to install the request confirmation component 220 at the client 200 in a form of such as a browser plug-in, an ActiveX component, etc., so that no burden on the client 200 side will be added and thus the user experience will be improved.

Optionally, the key 222 in the request confirmation component 220 may have a predetermined short lifetime and thus need to be regenerated when the key 222 expires, so as to enhance the confidentiality of the key 222 and thus improve the security of the system.

Optionally, by leveraging the same-origin policy of the browser, the request confirmation component 220 may be designed as a hidden iFrame and arranged in a domain different from other components including the request pre-submitting component 210, so that the key 222 in the request confirmation component 220 is inaccessible to the other components including the request pre-submitting component 210.

Figure 3:
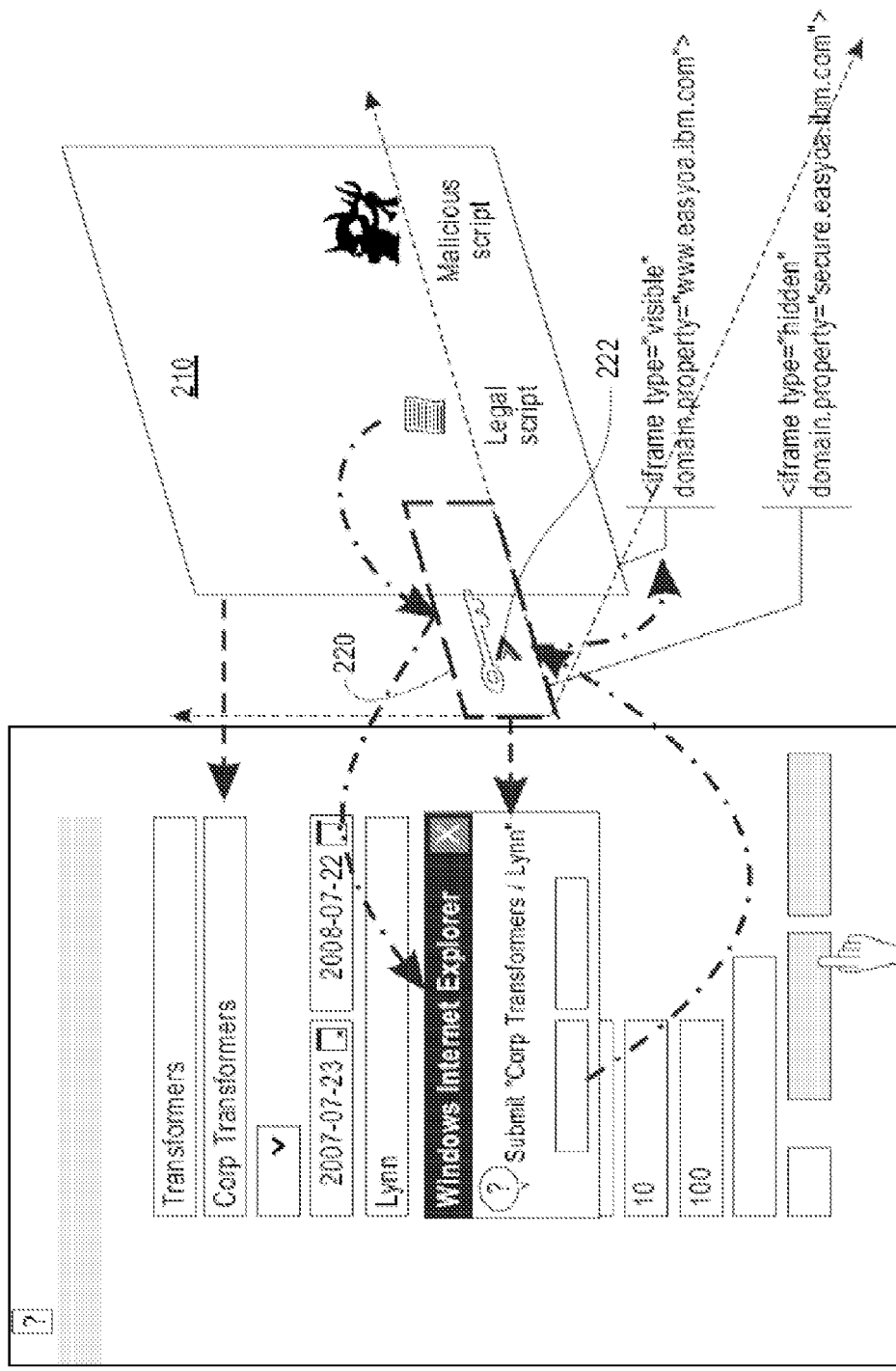
FIG. 3 illustrates an illustrative design of the client according to an embodiment of the invention.

FIG. 3 illustrates a design of the client 200. The request pre-submitting component 210 is an i frame arranged in the domain "www.easyoa.ibm.com" where a malicious script may be injected. The request confirmation component 220 is a hidden iFrame arranged in the domain "secure.easyoa.ibm.com". Due to the same-origin policy of the browser, the key 222 in the request confirmation component 220 is inaccessible to a malicious script in the request pre-submitting component 210, but the request pre-submitting component 210 may send a message to the request confirmation component 220 in a well-known cross-domain component communication method such as fragment identifier communication.

Of course, the request confirmation component 220 may also be implemented in a way other than the above way, for example, by a Flash component, as long as the key in the component is inaccessible to other components including the request pre-submitting component 210. The Flash implementation mechanism requires pre-installation of an additional plug-in in the browser, and therefore a security mechanism and storage of the key may be implemented in the plug-in. The browser per se isolates the plug-in from a JavaScript running environment, thereby ensuring that the security key stored in the plug-in will be inaccessible to an external script. Those skilled in the art will also appreciate that the request confirmation component 220 may alternatively be implemented in a form of such as a browser plug-in, an ActiveX component, etc., without taking the user experience etc. into account.

In response to the alarm message sent from the request pre-submitting component 210, the request confirmation component 220 in the client 200 pops up a request confirmation window on which the request description of the request is displayed for the user to confirm whether the request is a legal request. In response to confirmation of legality of the request, the request confirmation component 220 generates a request confirmation message associated with the request by using at least the key 222 stored therein and the unique identifier of the request, and sends the message to the server 300.

Optionally, the request confirmation component 220 may encrypt the UID of the request with the key and generates the request confirmation message containing at least the value of the encrypted UID.

Optionally, to prevent a malicious script in the request pre-submitting component 210 from deceiving the user by sending different request contents respectively to the server 300 and the request confirmation component 220, the request confirmation component 220 may further generate a request confirmation message containing information related to a request description of the request to enable the server to authenticate the request contents, wherein the information related to the request description of the request is, for example, the request description per se.

Optionally, due to a limitation to transmission data amount of the request confirmation component 220 per se, or in order to reduce transmission data amount between the request confirmation component 220 and the server 300, etc., the request confirmation component 220 may perform a hash operation on the request description of the request and contain in the request confirmation message the hash value of the request description as the information related to the request description of the request.

At the server 300 side, the request suspending unit 310 suspends the request with the UID from the client 200. Specifically, the request suspending unit 310 stores the request in a request pool 340 for authentication. The request verification unit 320 verifies whether the request is a legal request in accordance with the request confirmation message from the client 200, which is associated with the request by the UID of the request. The request execution unit 330 executes the request when the request is a legal request.

The server 300 may further include a request confirmation component issuance unit (not shown). In response to the user logging on to the Web application on the server 300 through the client 200, the request confirmation component issuance unit may generate the key 222 and issue the request confirmation component 220 containing the key 222 to the client 200.

Specifically, the request verification unit 320 may use a key identical to or corresponding to the key in the request confirmation component 220 to verify whether the request confirmation message has been encrypted with a specific key, i.e., the key in the request confirmation component 220 so as to verify whether the source of the request confirmation message is legal, that is, verify whether the request confirmation message is indeed from the request confirmation component 220 in the client 200 instead of being forged by a malicious script in the client 200.

Optionally, when the request confirmation message contains the value of the encrypted request UID, the request verification unit 320 may use a key identical or corresponding to the key in the request confirmation component 220 to decrypt the value of the encrypted request UID in the request confirmation message and search the request pool 340 for the request corresponding to the UID in accordance with the decrypted UID. When no request corresponding to the UID is found in the request pool 340, the request verification unit 320 may determine illegality of the source of the request confirmation message and hence discard the request confirmation message; and when the request corresponding to the UID is found in the request pool 340, the request verification unit 320 may determine legality of the source of the request confirmation message.

Optionally, to prevent a malicious script in the client 200 from deceiving the user by sending different request contents respectively to the server 300 and the request confirmation component 220, when the request confirmation message further contains the information related to the request description of the request, after verifying legality of the source of the request confirmation message, the request verification unit 320 may further use the information related to the request description of the request, which is contained in the request confirmation message, to verify the content of the request, that is, to verify whether the request description confirmed by the user in the request confirmation component 220 of the client 200 is consistent with the request description of the request received by the server 300, so as to verify whether the request is legal. For example, the request confirmation message may contain a hash value of the request description as the information related to the request description of the request, and the request verification unit 320 may perform a hash operation on the request description of the request and compare a resultant value with the hash value of the request description in the request confirmation message. Consistency between them indicates legality of the request.

As can be seen from the above, the request confirmation message is generated with the key 222 in the request confirmation component 220, which is inaccessible to other components in the client 200. Therefore, it is possible to ensure that the request confirmation message is not forged by a malicious script that may be injected into the other components of the client. Server 300 can then identify whether the request is legal by the non-forged request confirmation message, thereby enabling prevention of effective attacks by combinations of XSS and CSRF.

The apparatus for securely submitting a request in a client and the apparatus for securely processing a request in a server according to the embodiments of the invention have been detailed above with reference to the drawings.

Figure 4:
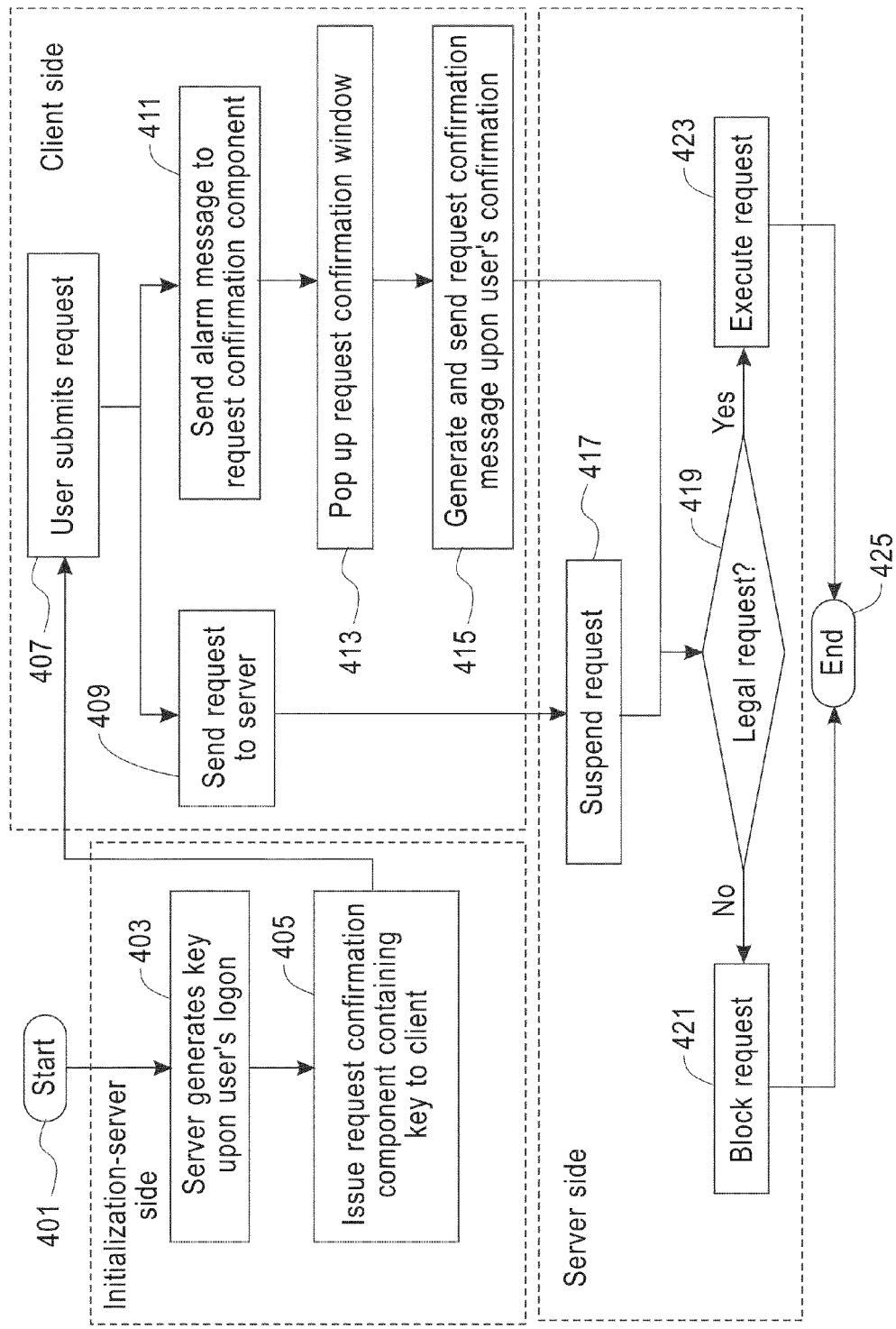
FIG. 4 illustrates a general flow chart of a method for securely submitting and processing a request according to an embodiment of the invention.

FIG. 4 illustrates a general flow chart of a method for securely submitting and processing of a request according to an embodiment of the invention. As illustrated in FIG. 4, a process flow of the method starts with step S401. As an initialization process, at the server side, the server may generate a key in response to a user logging on to a Web application on a server through a client in step S403. In step S405, the server issues to the client a request confirmation component containing the key inaccessible to other components in the client. As is apparent from the above, the initialization process may be omitted when the request confirmation component in the client is implemented in a form of such as a browser plug-in, an ActiveX control component, etc., preinstalled in the client.

At the client side, the user submits a request with a UID in a request pre-submitting component of the client in step S407. In step S409, the request pre-submitting component in the client sends the request to the server. In step S411, the request pre-submitting component in the client sends an alarm message containing the UID and a request description of the request to a request confirmation component in the client.

In step S413, in response to the alarm message sent from the request pre-submitting component, the request confirmation component in the client pops up a request confirmation window on which the request description is displayed for the user to confirm whether the request is a legal request. In step S415, in response to confirmation of legality of the request, the request confirmation component generates a request confirmation message associated with the request by using at least the key stored therein and the UID of the request and sends the message to the server.

At the server side, the request with the UID from the client is suspended in step S417. In step S419, it is verified whether the request is a legal request in accordance with the request confirmation message from the client, which is associated with the request by the UID of the request. When it is verified that the request is not a legal request in step S419, the request is blocked in step S421; and when it is verified that the request is a legal request in step S419, the request is executed in step S423. The method ends in step S425.

Although the above embodiments have been described in connection with an entire system including a client and a server, the apparatus on the client and the server in the present embodiments and the processes on the client and the server in the embodiments can be implemented separately.

The steps or components of the method and apparatus according to the present invention can be implemented with hardware, firmware, software, or a combination thereof, in any computing device, including a processor, a storage medium, or network of computing devices.

The present invention can be implemented by running a program or a set of programs on any general information processing device.

The present invention also provides a storage medium tangibly embodying program code for implementing the above method. The storage medium can be any storage medium.

In the apparatus and method according to the invention, the respective components or steps can be decomposed and/or recomposed and these decompositions and re-compositions shall be regarded as equivalent solutions of the invention. Furthermore, the steps in the above series of processes may be naturally but not necessarily executed in a sequential order as described. Some steps may be executed in parallel or independently from each other.

The embodiments of the invention have been described above, but those of ordinary skilled in the art will appreciate that the invention will not be limited to the specific details disclosed here but the above and various other modifications and variations may be made without departing from the spirit and scope of the invention as defined in the appended claims.

The invention claimed is:

1. Apparatus for securely submitting a request from a client to a server, the apparatus comprising:
    a request pre-submitting component configured to send a request with a unique identifier to the server; and
    a request confirmation component containing a key inaccessible to other components, where said request confirmation component resides in a hidden I frame in a browser having a same-origin policy and the request confirmation component is arranged in a domain different from the other components, so that the key in the request confirmation component is inaccessible to the other components;
    wherein said request pre-submitting component is further configured to send an alarm message containing said unique identifier and a request description of the request to the request confirmation component;
    wherein said request confirmation component is configured to pop up a request confirmation window, on which the request description is displayed, in response to the alarm message; and
    wherein said request confirmation component is further configured to generate a request confirmation message associated with the request by using at least the key and the unique identifier and to send the request confirmation message to the server in response to confirmation of legality of the request.

2. The apparatus according to claim 1, further comprising:
    means for receiving the request confirmation component and the key therein from the server upon logging on to the server.

3. The apparatus according to claim 1 wherein the key in the request confirmation component expires after a predetermined lifetime, said apparatus further comprising:
    means for generating a new key in the request confirmation component after expiration of said predetermined lifetime.

4. The apparatus according to claim 1, wherein the request confirmation component is further configured to generate the request confirmation message by using the request description in addition to the key and the unique identifier.

5. A method for securely submitting a request, the method operating in a client data processor containing a request confirmation component having a key inaccessible to other components of the client, the method comprising the steps of:
    placing the request confirmation component in a hidden iFrame in a domain different from the other components, so that the key in the request confirmation component is inaccessible to the other components;
    obtaining a unique identifier for a request;
    sending a request with the unique identifier to a server;
    popping up a request confirmation window displaying a description of the request;
    receiving a confirmation of legality of the request;
    in response to the confirmation of legality of the request, generating a request confirmation message associated with the request by the use of at least the key and the unique identifier; and
    sending the confirmation message to the server.

6. The method according to claim 5, further comprising the step of obtaining from the server the request confirmation component, containing the key generated by the server, upon logging on to the server.

7. The method according to claim 5, wherein the key in the request confirmation component has a predetermined lifetime, said method including the further step of generating a new key after said predetermined lifetime expires.

8. The method according to claim 5, wherein the step of generating the request confirmation message uses the request description in addition to the key and the unique identifier.

9. A non-transitory computer-readable storage medium tangibly embodying computer-executable program instructions which, when executed, cause a client computer which contains a request confirmation component having a key inaccessible to other components of the client, to perform a method for securely submitting a request to a server according to claim 5.

10. Apparatus for securely processing a request in a server, comprising:
 a request suspending unit configured to receive from a client a request and a unique identifier associating the request with a request confirmation message and further configured to suspend the request;
 a request verification unit configured to receive the request confirmation message and to verify, in accordance with the request confirmation message associated with the request by the unique identifier, whether the request is a legal request;
 a request execution unit configured to execute the request when the request is a legal request; and
 a request confirmation component issuance unit configured to (i) generate a key inaccessible to components other than a request confirmation component in the client in response to logging on to the server, (ii) issue a request confirmation component containing the key to the client, and (iii) arrange the request confirmation component in a hidden iFrame in a domain different from the other components by leveraging a same-source policy of a browser in the client.

11. The apparatus according to claim 10, wherein the request verification unit is further configured to verify whether a source of the request confirmation message is legal by verifying whether the request confirmation message is generated with a specific key.

12. The apparatus according to claim 11, wherein the request verification unit is further configured to verify whether the request is a legal request by verifying a content of the request with information related to a request description of the request, wherein the request is contained in the request confirmation message.

13. A method for securely processing a request in a server, comprising:
 generating a key inaccessible to components other than a request confirmation component in a client in response to the client logging onto the server;
 issuing to the client a request confirmation component comprising the key, where said request confirmation component is arranged in a hidden i frame in a domain different from the other components in the client by leveraging a same-source policy of a browser in the client;
 receiving a request with a unique identifier from a client;
 suspending the request;
 receiving from the client a request confirmation message associated with the request by the unique identifier;
 verifying in accordance with the request confirmation message whether the request is a legal request; and
 executing the request when the request is a legal request.

14. The method according to claim 13, wherein the step of verifying further comprises the step of:
 verifying whether a source of the request confirmation message is legal by verifying whether the request confirmation message is generated with a specific key.

15. The method according to claim 14, wherein the step of verifying whether the request is a legal request further comprises the step of:
 verifying a content of the request with information related to a request description of the request contained in the request confirmation message.

16. A non-transitory computer-readable storage medium tangibly embodying computer-executable program instructions which, when executed, cause a server computer to securely process a request from a client computer by performing the method according to claim 13.

* * * * *